United States Patent
Hilbrecht et al.

(10) Patent No.: US 12,151,209 B2
(45) Date of Patent: Nov. 26, 2024

(54) REVERSE OSMOSIS ARRANGEMENT

(71) Applicant: Danfoss A/S, Nordborg (DK)

(72) Inventors: Lars Bjarne Hilbrecht, Sommersted (DK); Francisco Javier Lorenzo, Nordborg (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 17/831,882

(22) Filed: Jun. 3, 2022

(65) Prior Publication Data

US 2022/0395779 A1 Dec. 15, 2022

(30) Foreign Application Priority Data

Jun. 15, 2021 (EP) .................................. 21179452

(51) Int. Cl.
*B01D 61/02* (2006.01)
*B01D 61/06* (2006.01)
*B01D 61/08* (2006.01)

(52) U.S. Cl.
CPC .......... *B01D 61/06* (2013.01); *B01D 61/025* (2013.01); *B01D 61/08* (2013.01); *B01D 2313/18* (2013.01); *B01D 2313/19* (2013.01); *B01D 2313/243* (2013.01); *B01D 2313/246* (2013.01); *B01D 2317/022* (2013.01); *B01D 2317/04* (2013.01)

(58) Field of Classification Search
CPC ................ B01D 61/06; B01D 2313/18; B01D 2313/19; B01D 2313/246; B01D 2321/2083
See application file for complete search history.

(56) References Cited

U.S. PATENT DOCUMENTS

| | | | |
|---|---|---|---|
| 5,034,121 A | 7/1991 | Budin et al. | |
| 5,690,829 A | 11/1997 | Lauer | |
| 6,168,714 B1 | 1/2001 | Ilias et al. | |
| 8,137,539 B2 | 3/2012 | Gilron et al. | |
| 2013/0277310 A1 | 10/2013 | Okeljas, Jr. | |
| 2015/0246316 A1* | 9/2015 | Chancellor | B01D 65/02 210/138 |
| 2017/0066670 A1* | 3/2017 | El-Sayed | C02F 1/445 |
| 2018/0001264 A1 | 1/2018 | Song et al. | |

FOREIGN PATENT DOCUMENTS

| | | | | |
|---|---|---|---|---|
| CA | 1329730 C | 5/1994 | | |
| CN | 111194235 A | 5/2020 | | |
| FR | 3016931 A1 * | 7/2015 | | F03G 7/005 |
| KR | 2007-0035554 A | 3/2007 | | |
| WO | WO-2013033841 A1 * | 3/2013 | | H01L 21/0237 |
| WO | 2020244999 A1 | 12/2020 | | |

OTHER PUBLICATIONS

Rojey A—FR-3016931-A1 machine translation—Jul. 2015 (Year: 2015).*
First Examination Report corresponding to Indian Patent Application No. 202214015548, dated Jan. 24, 2023.

* cited by examiner

*Primary Examiner* — Bradley R Spies
(74) *Attorney, Agent, or Firm* — McCormick, Paulding & Huber PLLC

(57) ABSTRACT

A reverse osmosis arrangement is described, the first chamber (5) having a first port (7) and a second port (8) and the second chamber (6) being connected to a permeate outlet (9), wherein the first port (7) is connected to a first pump (13). Such a reverse osmosis arrangement should be operated with high efficiency. To this end the second port (8) is connected to a second pump (14).

20 Claims, 2 Drawing Sheets

REVERSE OSMOSIS ARRANGEMENT

CROSS-REFERENCE TO RELATED APPLICATION

This application claims foreign priority benefits under U.S.C. § 119 from European Patent Application No. 21179452.4, filed Jun. 15, 2021, the content of which is hereby incorporated by reference in its entirety.

TECHNICAL FIELD

The present invention relates to a reverse osmosis arrangement comprising a membrane unit having a housing and a membrane separating a first chamber and a second chamber in the housing, the first chamber having a first port and a second port and the second chamber being connected to a permeate outlet, wherein the first port is connected to a first pump.

BACKGROUND

Such a reverse osmosis arrangement is used, for example, to treat wastewater or sea water in order to remove unwanted ingredients. For example, such a reverse osmosis arrangement can be used for desalinating of sea water.

The following explanation is made with the desalination of sea water as an example. However, the reverse osmosis arrangement is not limited to the use in combination with sea water.

When sea water is desalinated, the sea water is supplied to the first chamber via the first port. The first pump produces a rather high pressure in the magnitude of several tens of bar. The membrane in the housing is a semipermeable membrane. Part of the sea water penetrates the membrane without the salt and leaves the second chamber via the permeate outlet. The remaining water having a higher concentration of salt leaves the chamber via the second port. This fluid is also called brine.

It is known to increase the lifetime of the membrane by reversing the flow through the membrane unit from time to time. To this end the sea water is supplied to the second port and the brine leaves the first chamber via the first port. The permeate is still leaving the second chamber via the permeate outlet.

The brine has still a rather high pressure. Without additional measures this high pressure is lost leading to a waste of energy.

SUMMARY

The object underlying the invention is to operate a reverse osmosis arrangement with high efficiency.

This object is solved with a reverse osmosis arrangement as described at the outset in that the second port is connected to a second pump.

In this way reverse of the flow through the membrane unit is performed by using the first pump to generate a flow through the membrane unit in a first direction and by using the second pump to create a flow through the membrane unit in the opposite direction.

In an embodiment of the invention the first pump is operatively connected to a first reversible electric machine and the second pump is connected to a second reversible electric machine, wherein the first pump can be operated as hydraulic motor driving the first electric machine and the second pump can be operated as hydraulic motor driving the second electric machine. This embodiment has the advantage that the high pressure of the brine can be used to operate the pump arranged at the side of the membrane unit at which the brine leaves the first chamber. The energy of the brine with the high pressure and thus with the high energy is transformed by the pump in electric energy, since the brine drives the hydraulic motor and the hydraulic motor in turn drives the electric machine. The electric machine can be, for example, a variable frequency device. Thus, the hydraulic energy of the brine is converted into electric energy. The electric energy can be used at another location.

In an embodiment of the invention at least one of first pump and second pump is an axial piston machine. An axial piston machine comprises, for example, a cylinder drum in which a plurality of cylinders is arranged. Each cylinder comprises a piston which rests with one end against a swash plate. When the cylinder drum is rotated, a swash plate drives the pistons in the cylinder to perform a pumping action. When, on the other hand, hydraulic fluid under high pressure is supplied to the cylinders, this high pressure moves the pistons and produces a rotating movement of the cylinder drum due to the cooperation of the pistons with the swash plate. Thus, an axial piston machine is in particular useful to be operated as pump and as motor.

In an embodiment of the invention the first electric machine and the second electric machine are connected by an electric line transferring electric power between the first electric machine and the second electric machine. Thus, the electric power produced by the electric machine which is driven by the pump, when the pump is operated as motor, can directly be supplied to the other electric machine driving the pump. Since the distance between the two electric machines is short, the electric losses are low.

In an embodiment of the invention a first dump valve is arranged in parallel to the first pump and a second dump valve is arranged in parallel to the second pump. When the flow through the membrane unit is reversed, there is a risk of unwanted particles being flushed out of the first chamber. These particles could damage the respective machine arranged at the outlet side of the first chamber. Thus, the dump valve can be opened to avoid the entrance of unwanted particles into the respective pump. The dump valve connects the membrane unit to a brine line.

In an embodiment of the invention a first flow restriction is arranged between the first dump valve and a brine line and a second flow restriction is arranged between the second dump valve and the brine line. The flow restrictions can be, for example, in form of an orifice. This has the advantage that the pressure drops over the dump valve can be kept small, so that the dump valves do not produce too high costs.

In an embodiment of the invention at least a second parallel membrane unit is arranged in parallel to the membrane unit. Thus, two or more membrane units can be arranged in parallel to allow a large flow through the reverse osmosis arrangement and correspondingly a high production of permeate.

In an embodiment of the invention at least a second serial membrane unit is arranged in series with the membrane unit. The brine leaving the first chamber has still a rather high pressure. This pressure can be used in a following step of desalination or treatment of water. It is possible to gain permeate also from the brine. Thus, a multistage reverse osmosis arrangement can be used. It is also possible to use in each stage a number of membrane units arranged in parallel.

In an embodiment of the invention an interstage pump is arranged between the membrane unit and the first serial membrane unit. If more than two stages are used, such an interstage pump can be arranged between each stage. The interstage pump can increase the pressure of the brine leaving the membrane unit. Thus, the following membrane unit can be supplied with sea water under the desired elevated pressure.

In an embodiment of the invention the interstage pump is a bi-directional pump. Thus, even a sequence of two or more membrane units can be operated in two directions.

In an embodiment of the invention a third dump valve connects a point between the membrane unit and the interstage pump with the brine line and a fourth dump valve connects a point between the serial membrane unit and the interstage pump with the brine line. In this case also the interstage pump can be protected from unwanted particles which can be flushed out of the first chamber of each membrane unit when the flow direction is reversed.

In an embodiment of the invention a third flow restriction is arranged between the third dump valve and the brine line and a fourth flow restriction is arranged between the fourth dump valve and the brine line. Again, the flow restrictions can be realized by an orifice or the like. In this way it is possible to keep the pressure drop over the dump valves low, so that the dump valves do not produce too much costs.

BRIEF DESCRIPTION OF THE DRAWINGS

Preferred embodiments of the invention will now be described with reference to the drawing, in which.

Same elements are denoted with same reference numbers in all Fig.

DETAILED DESCRIPTION

Figure 1:
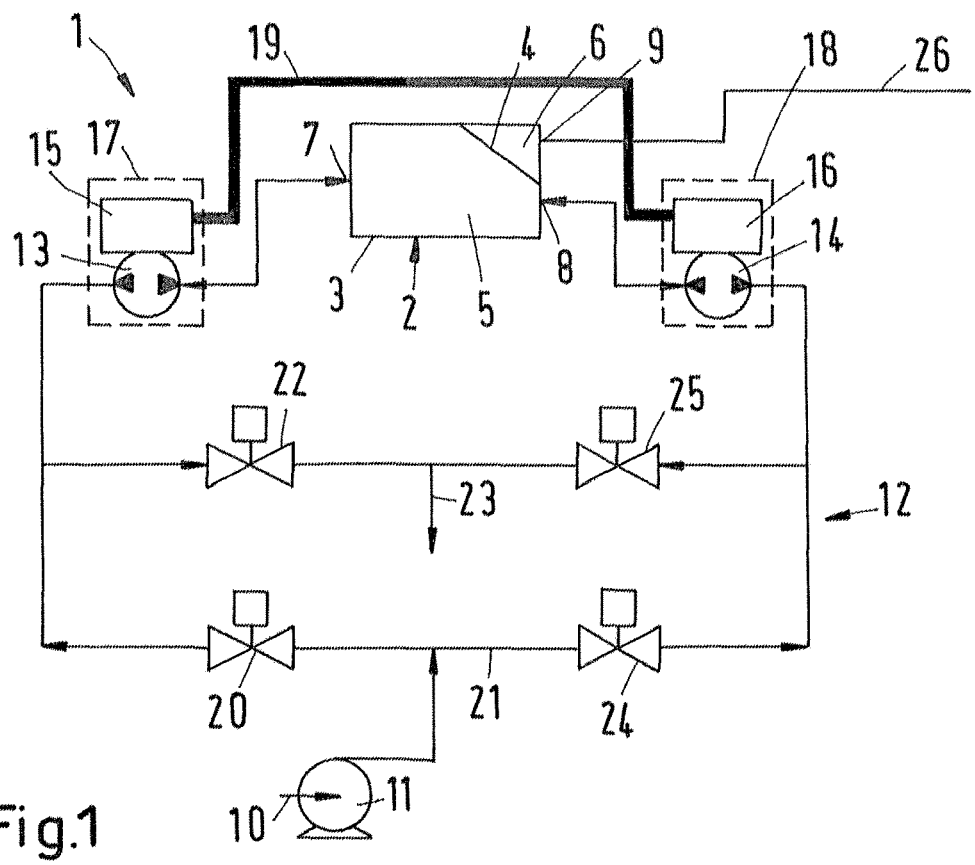
FIG. 1 shows a first embodiment of the invention.

FIG. 1 shows a reverse osmosis arrangement 1 comprising a membrane unit 2 having a housing 3 and a membrane 4 separating a first chamber 5 and a second chamber 6 in the housing 3. The first chamber 5 has a first port 7 and a second port 8 and the second chamber 4 is connected to a permeate outlet 9.

Water to be purified, for example sea water 10 having a low pressure is pumped by means of a boost pump 11 into a piping system 12. The piping system 12 connects the boost pump to a first pump 13 and to a second pump 14. The first pump 13 is operatively connected to a first reversible electric machine 15 and the second pump 14 is operatively connected to a second reversible electric machine 16. The first pump 13 and the first reversible electric machine 15 form together a bidirectional drive 17. The second pump 14 and the second reversible electric machine 16 form together a second bidirectional drive 18.

The first pump 13 and the second pump 14 can be, for example, in form of an axial piston machine. An axial piston machine comprises a cylinder drum which can be rotated. The cylinder drum comprises a number of cylinders. A piston is arranged in each cylinder. The piston rests against a swash plate which is tilted with respect to an axis of rotation of the cylinder drum. When the cylinder drum is rotated, the swash plate produces a reciprocating movement of the pistons in the cylinder and thus a pumping action, so that the axial piston machine can be operated as pump in this case. However, the axial piston machine can also be operated as motor. In this case, hydraulic fluid under pressure is supplied to the cylinder pressing the pistons against the swash plate. Since the swash plate is tilted with respect to the axis of rotation of the cylinder drum, this pressure produces a rotating movement of the cylinder drum, so that in this case the axial piston machine is operated as motor.

The reversible electric machines 15, 16 can be operated in motor mode and in generator mode. Since they can be operated in both modes in both directions (clockwise and counter clockwise) they allow an operation in four quadrants (motor clockwise and counter clockwise and generator clockwise and counter clockwise).

When the first reversible electric machine 15 is operated as motor, it drives the first pump 13. The first pump 13 drives the sea water through the membrane unit 2. The brine leaving the second port 8 is supplied to the second pump 14, which in this case is operated as motor and drives the second reversible electric drive 16. In this mode of operation the second reversible electric drive 16 is operated as generator producing electric energy which can be transferred to the first reversible electric drive 15 by means of an electric line 19 transferring the electric power between the second reversible electric machine 16 and the first reversible electric machine 15.

When the flow through the membrane unit 2 is reversed, the second pump 14 is used to drive the sea water through the membrane unit 2 and the first pump 13 is used as motor. In this case the second reversible electric machine 16 is working in motor mode. The brine leaving the first port of the chamber 5 drives the first pump 13 in motor mode. The first reversible electric machine 15 is then operated as generator producing electric energy which is transferred via the electric line 19 to the second reversible electric machine 16.

In order to control the flow between the boost pump 11 and the first pump 13 or the second pump 14, respectively, a first input valve 20 is arranged between the boost pump 11, more precisely between a feed line 21 into which the boost pump 11 supplies the sea water, and the first pump 13. A first outlet valve 22 is arranged between the first pump 13 and a brine line 23. A second input valve 24 is arranged between the feed line 21 and the second pump 14 and a second outlet valve 25 is arranged between the second pump 14 and the brine line 23. All valves 20, 22, 24, 25 can be in form of motor valves.

The permeate outlet 9 of the membrane unit 2 is connected to a permeate line 26.

The use of the two pumps 13, 14 has a number of advantages. The feed flow direction through the membrane unit 2 can be frequently changed reducing fowling and scaling. Thus, lower chemical consumption for cleaning and descaling is required. A reduction in downtime for cleaning is achieved. The service life of the membrane 4 is increased. Thus, less downtime for membrane replacement is required. Furthermore, costs for membrane module replacement are reduced. There is an increase recovery rate of the energy of the brine recovered directly after leaving the membrane unit 2, so that piping required for high pressure flow can be kept short. This reduces costs for piping. The use of two pumps 13, 14 on both sides of the membrane unit 3 enables a variable and individual control of the recovery rate of the membrane 4. A variable control of i.e., the recovery rate can increase the service life of the membrane 4, optimize the energy consumption needed for the reverse osmosis process and adjust the system to operate with different kind of fluids. This can be of benefit when there are changes in the composition of the sea water entering the membrane unit 2, for wastewater treatment systems and other industrial reverses osmosis processes.

The drive units 17, 18 convert the hydraulic energy to electrical energy. The electrical energy can either be fed directly to the electrical grid or to other drive units.

Figure 2:
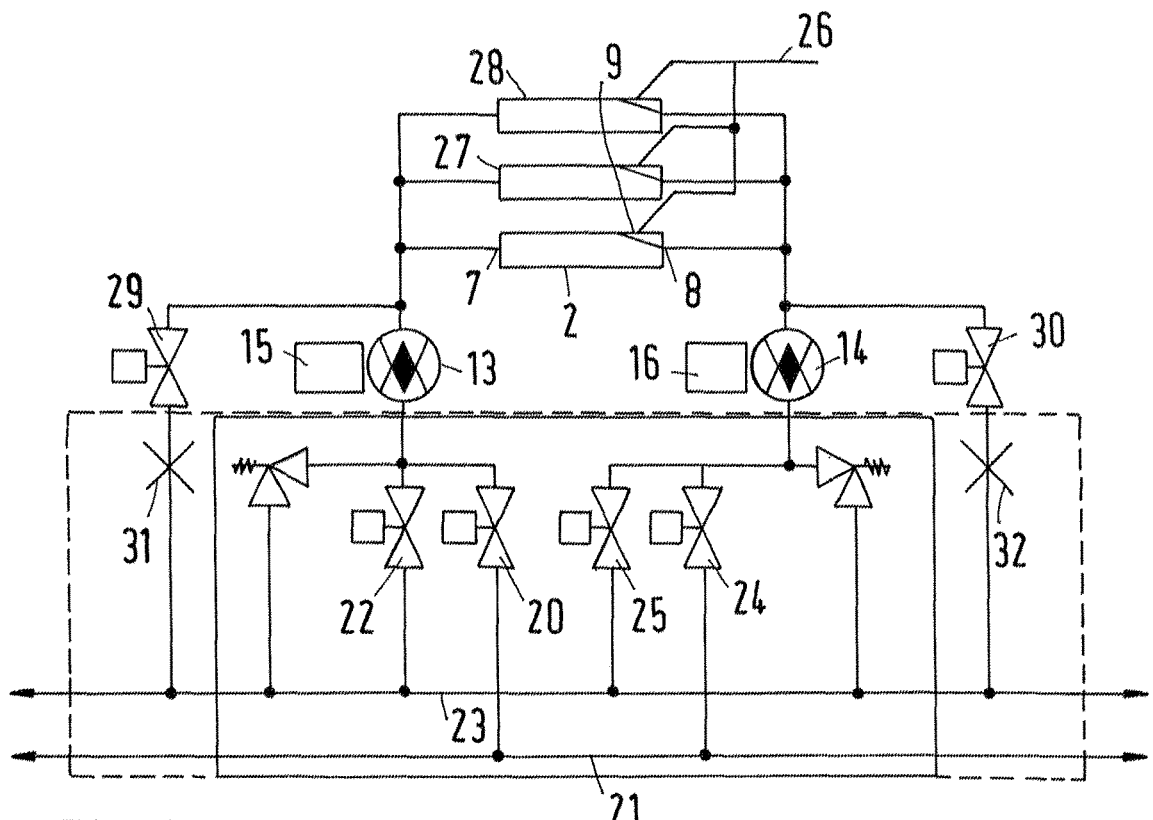
FIG. 2 shows a second embodiment of the invention.

FIG. 2 shows a second embodiment of the invention, in which the same elements are denoted with the same reference numerals.

The boost pump 10 is not shown. Only shown is the feed line 21 and the brine line 23. A first difference is that not only one membrane unit 2 is used, but two more membrane units 27, 28. All membrane units 2, 27, 28 are arranged in parallel, i.e. the membrane unit 2 and a first parallel membrane unit 27 and a second parallel membrane unit 28 are arranged in parallel. All membrane units 2, 27, 28 are connected with their first ports 7 to the first pump 13 and with their second ports 8 to the second pump 14. The permeate outlets 9 of the membrane units 2, 27, 28 are connected to the permeate line 26.

A second difference is that a first dump valve 29 is arranged in parallel to the first pump 13 and a second dump valve 30 is arranged in parallel to the second pump 14. A first flow restriction 31 is arranged between the first dump valve 29 and the brine line 23 and a second flow restriction 32 is arranged between the second dump valve 30 and the brine line 23. The flow restrictions 31, 32 can be in form of an orifice, for example. They lower a pressure drop over the respective dump valve 29, 30.

It should be noted that these dump valves 29, 30 can also be used in connection with the embodiment shown in FIG. 1.

When the first pump 13 is used to pump the sea water through the membrane units 2, 27, 28 and the flow through the membrane units 2, 27, 28 is then reversed, there is a risk that unwanted particles are flushed out of the first chamber 5. These particles could damage the first pump 13. Thus, the first dump valve 29 is opened for a predetermined time or as long as such particles are detected in the flow out of the membrane units 2, 27, 28. When all dirt is removed from the membrane units 2, 27, 28, the first dump valve 29 is closed and the first pump 13 is operated again as motor.

In the same way, when the flow through the membrane units 2, 27, 28 is again reversed and the sea water is driven through the membrane units 2, 27, 28 by means of the first pump 13, the second dump valve 30 is opened to allow the unwanted particles which are flushed out of the first chamber 5 to flow directly to the brine line 23. When there are no particles of other dirt in the fluid coming out of the membrane units 2, 27, 28, the second dump valve 30 is closed and the second pump 14 is again operated as motor driving the second reversible electric machine 16 to produce electric energy. The electric line 19 between the two drives 17, 18 is not shown. However, it can be provided.

Figure 3:
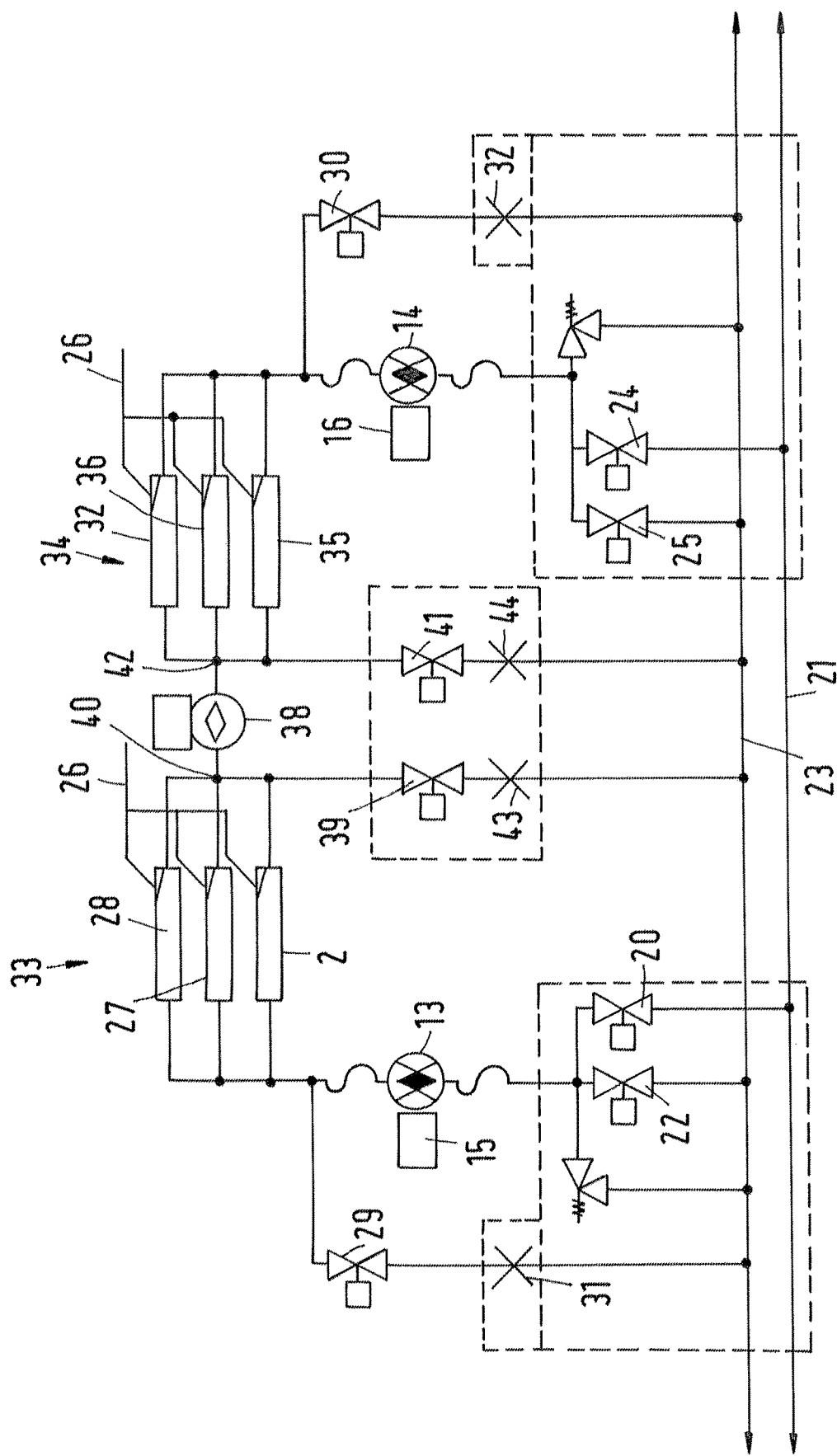
FIG. 3 shows a third embodiment of the invention.

FIG. 3 shows a third embodiment in which elements corresponding to elements of FIGS. 1 and 2 are denoted with the same reference numerals.

The embodiment of FIG. 3 is a multistage arrangement having a first stage 33 of membrane units 2, 27, 28 and a second stage 34 of membrane units 35, 36, 37. The membrane units of the second stage 34 are termed "serial membrane units". Thus, at least a second serial membrane unit 35 is arranged in series with the membrane unit 2 or with the arrangement of two or more membrane units 2, 27, 28 arranged in parallel.

An interstage pump 38 is arranged between the two stages 33, 34. The interstage pump 38 is a bidirectional pump, i.e. it can pump liquid from the first stage 33 to the second stage 34 or from the second stage 34 to the first stage 33.

If more than the two stages 33, 34 are used, an interstage pump 38 in form of a bidirectional pump can be arranged between each stage 33, 34.

A third dump valve 39 connects a point 40 between the membrane units 2, 27, 28 and the interstage pump 38 with the brine line 23 and a fourth dump valve 41 connects a point 42 between the serial membrane units 35, 36, 37 and the interstage pump 38 with the brine line 23.

A third flow restriction 43 is arranged between the third dump valve 39 and the brine line 23 and a fourth flow restriction 44 is arranged between the fourth dump valve 41 and the brine line 23. The flow restrictions 43, 44 can be, for example, in form of orifices.

When the embodiment shown in FIG. 3 is operated, the first pump 13 pumps sea water from the feed line 21 through the first stage 33 of membrane units 2, 27, 28. The brine leaving this stage 33 is combined at point 40 and supplied to the interstage pump 38. The interstage pump 38 can increase the pressure again, so that the pressure loss of the first stage 33 can be compensated or overcompensated. In some cases, this is necessary, since the brine leaving the first stage 33 has a higher salt concentration so that a higher pressure is required in the second stage 34 of serial membrane units 35, 36, 37. The brine which is supplied to the second stage 34 of serial membrane units 35, 36, 37 produces again permeate which is fed to the permeate line 26. The brine leaving the serial membrane units 35, 36, 37 having an either higher salt concentrate is again used to operate the second pump 14 as motor. The second pump 14 drives the second reversible electric machine 16 which is in this case used as generator producing electric energy which can be transferred to the first reversible electric machine 15. The electric line 19 is not shown.

When the flow direction is reversed by operating the valves 20, 22, 24, 25, there is a risk that unwanted particles which are flushed out of the serial membrane units 35, 36, 37 of the second stage 34 damage the interstage pump 38. To avoid such damage the fourth dump valve 41 is opened to allow this polluted liquid to enter directly the brine line 23. After a predetermined time, or, when a corresponding sensor is provided, after detection that the fluid leaving the membrane units 35, 36, 37 of the second stage 34 is "clean" enough, the fourth dump valve 41 is closed an the liquid can be pumped by the interstage pump 38 into the membrane units 2, 27, 28 of the first stage 33. Since again dirt or particles are flushed out of the membrane units 2, 27, 28 of the first stage 33, the first dump valve 29 is opened until the liquid leaving the membrane units 2, 27, 28 of the first stage 33 is clean enough. Thereafter, the first dump valve 29 is closed and the first pump 13 is operated as motor driving the first reversible electric machine 15.

The same operation is performed when the flow direction is reversed again. After reversing the flow direction, the first dump valve 39 is opened to allow particles or dirt flushed out of the membrane units 2, 27, 28 of the first stage 33 to flow directly to the brine line 23. When the liquid is clean enough, the third dump valve 39 is closed and the interstage pump 38 can pump the liquid through the serial membrane units 35, 36, 37 of the second stage 34. At this time the second dump valve 30 is opened to allow the particles or dirt from the serial membrane units 35, 36, 37 of the second stage 34 to flow directly to the brine line 23. Only, when the liquid leaving the membrane units 35, 36, 37 of the second stage 34 is clean enough, the fourth dump valve 30 is closed and the liquid is used to operate the second pump 14 as motor.

In a way not shown, it is possible to control the flow of the sea water through the membrane units 2, 27, 28 or through the serial membrane units 35, 36, 37 in a way, that only one or few of the membrane units 2, 27, 28 or of the serial membrane units 35, 36, 37 is used at the same time.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A reverse osmosis arrangement comprising a membrane unit having a housing and a membrane separating a first chamber and a second chamber in the housing, the first chamber having a first port and a second port and the second chamber being connected to a permeate outlet, wherein the first port is connected to a first pump, wherein the second port is connected to a second pump, wherein the first pump is operatively connected to a first reversible electric machine and the second pump is connected to a second reversible electric machine, wherein the first pump can be operated as hydraulic motor driving the first electric machine and the second pump can be operated as hydraulic motor driving the second electric machine, and wherein the first electric machine and the second electric machine are connected by an electric line arranged for directly transferring electric power between the first electric machine and the second electric machine.

2. The reverse osmosis arrangement according to claim 1, wherein at least one of first pump and second pump is an axial piston machine.

3. The reverse osmosis arrangement according to claim 1, wherein a first dump valve is arranged in parallel to the first pump and a second dump valve is arranged in parallel to the second pump.

4. The reverse osmosis arrangement according to claim 3, wherein a first flow restriction is arranged between the first dump valve and a brine line, and a second flow restriction is arranged between the second dump valve and the brine line.

5. The reverse osmosis arrangement according to claim 1, wherein at least a second parallel membrane unit is arranged in parallel to the membrane unit.

6. The reverse osmosis arrangement according to claim 1, wherein at least a second serial membrane unit is arranged in series with the membrane unit.

7. The reverse osmosis arrangement according to claim 6, wherein an interstage pump is arranged between the membrane unit and the first serial membrane unit.

8. The reverse osmosis arrangement according to claim 7, wherein the interstage pump is a bidirectional pump.

9. The reverse osmosis arrangement according to claim 8, wherein a third dump valve connects a point between the membrane unit and the interstage pump with the brine line, and a fourth dump valve connects a point between the serial membrane unit and the interstage pump with the brine line.

10. The reverse osmosis arrangement according to claim 9, wherein a third flow restriction is arranged between the third dump valve and the brine line, and a fourth flow restriction is arranged between the fourth dump valve and the brine line.

11. A reverse osmosis arrangement comprising a membrane unit having a housing, a membrane separating a first chamber and a second chamber in the housing, the first chamber having a first port and a second port and the second chamber being connected to a permeate outlet, a first input valve, a first outlet valve, a second input valve and a second outlet valve, wherein the first port is connected to a first pump, wherein the second port is connected to a second pump, and wherein a first dump valve is arranged in parallel to the first pump and a second dump valve is arranged in parallel to the second pump.

12. The reverse osmosis arrangement according to claim 11, wherein the first pump is operatively connected to a first reversible electric machine and the second pump is connected to a second reversible electric machine, wherein the first pump can be operated as hydraulic motor driving the first electric machine and the second pump can be operated as hydraulic motor driving the second electric machine.

13. The reverse osmosis arrangement according to claim 11, wherein at least one of first pump and second pump is an axial piston machine.

14. The reverse osmosis arrangement according to claim 11, wherein a first flow restriction is arranged between the first dump valve and a brine line, and a second flow restriction is arranged between the second dump valve and the brine line.

15. The reverse osmosis arrangement according to claim 11, wherein at least a second parallel membrane unit is arranged in parallel to the membrane unit.

16. The reverse osmosis arrangement according to claim 11, wherein at least a second serial membrane unit is arranged in series with the membrane unit.

17. The reverse osmosis arrangement according to claim 16, wherein an interstage pump is arranged between the membrane unit and the first serial membrane unit.

18. The reverse osmosis arrangement according to claim 17, wherein the interstage pump is a bidirectional pump.

19. The reverse osmosis arrangement according to claim 18, wherein a third dump valve connects a point between the membrane unit and the interstage pump with the brine line, and a fourth dump valve connects a point between the serial membrane unit and the interstage pump with the brine line.

20. The reverse osmosis arrangement according to claim 19, wherein a third flow restriction is arranged between the third dump valve and the brine line, and a fourth flow restriction is arranged between the fourth dump valve and the brine line.

* * * * *